(12) United States Patent
Bloomberg

(10) Patent No.: US 6,439,465 B1
(45) Date of Patent: Aug. 27, 2002

(54) ENCODING SMALL AMOUNTS OF EMBEDDED DIGITAL DATA AT ARBITRARY LOCATIONS WITHIN AN IMAGE

(75) Inventor: Dan S. Bloomberg, Palo Alto, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/404,962

(22) Filed: Sep. 24, 1999

(51) Int. Cl.[7] .............................................. G06K 19/06
(52) U.S. Cl. ............................. 235/494; 283/93; 283/70
(58) Field of Search ................................. 235/494, 487, 235/454, 462.25, 462.07; 283/93, 70; 382/100

(56) References Cited

U.S. PATENT DOCUMENTS

| | | | | |
|---|---|---|---|---|
| 4,837,904 A | * | 6/1989 | Abe et al. ..................... 235/487 |
| 5,319,543 A | * | 6/1994 | Wilhelm ........................ 705/3 |
| 5,513,013 A | * | 4/1996 | Kuo ............................ 358/448 |
| 5,521,372 A | * | 5/1996 | Hecht et al. ................. 235/494 |
| 5,541,396 A | | 7/1996 | Rentsch ....................... 235/454 |
| 5,801,067 A | * | 9/1998 | Shaw et al. ............. 235/454 X |
| 6,032,137 A | * | 2/2000 | Ballard ........................ 705/75 |
| 6,032,861 A | * | 3/2000 | Lemelson et al. ...... 235/494 X |
| 6,102,289 A | * | 8/2000 | Gabrielson ............. 235/494 X |
| 6,256,398 B1 | * | 7/2001 | Chang ......................... 382/100 |
| 6,298,142 B1 | * | 10/2001 | Nakano et al. ............. 382/100 |

FOREIGN PATENT DOCUMENTS

JP 11-314444 A * 11/1999

OTHER PUBLICATIONS

U.S. patent application Ser. No. 09/404,755, Illowsky et al., filed Sep. 24, 1999.

* cited by examiner

Primary Examiner—Michael G. Lee
Assistant Examiner—Jared J. Fureman

(57) ABSTRACT

Individual glyph frames for providing simple data blocks that may be read individually. A frame is usually on the order of $1/6^{th}$ of an inch in size and can be used as a pointer to anywhere on the page or can contain a small piece of data such as the page or form number. The format of the data can be stored in the sync lines or as part of the data

15 Claims, 1 Drawing Sheet

ENCODING SMALL AMOUNTS OF EMBEDDED DIGITAL DATA AT ARBITRARY LOCATIONS WITHIN AN IMAGE

BACKGROUND OF THE INVENTION

A method of implementing glyphs so that each block of glyphs can be independently read, by putting into the sync lines of each block data on how the included data is formatted and therefore, how it should be read out.

A glyph is a diagonal line printed on paper that slopes at one angle to indicate one state of a bit, and at a different angle to indicate the other state. Here, a block of information is in numerical or word form, and there is no intended image. Glyphs are small, typically $\frac{1}{60}^{th}$ of an inch on center and a 10 by 10 glyph block appears as a gray square.

Numerous patents have issued on the generation and use of glyphs, such as U.S. Pat. No. 5,245,165, Self-Clocking Glyph Code for Encoding Dual Bit Digital Values Robustly; U.S. Pat. No. 5,449,895, Explicit Synchronization for Self-Clocking Glyph Codes; and U.S. Pat. No. 5,521,372, Framing Codes for Robust Synchronization and Addressing of Self-Clocking Glyph Codes, which are incorporated by reference herein.

Typically, glyphs are used in areas that appear to be gray, but are actually a number of blocks in series, with the first one or more containing all of the meta data required to read the remaining blocks in a "key-codeword". A result of this system is that the number of each block must be known before its data can be read meaningfully, and individual blocks can not exist independently.

It would be advantageous for each block to exist independently, so that individual blocks could be placed anywhere on the page.

SUMMARY OF THE INVENTION

A block of glyphs typically consists of four sync lines of glyphs framing a rectangular or square group of data glyphs. For a numerical example, the sync lines could be ten glyphs in length and at right angles to define a 10 by 10 glyph block enclosing an eight by eight glyph area to be used for data. In this implementation, the sync lines could use some of its sync bits to identify the block as a glyph block, and the remaining sync bits to identify the format of the glyphs in the enclosed eight by eight glyph area. The result is a readable data block that can be $\frac{1}{6}^{th}$ of an inch which appears to be gray and which can be printed anywhere on the page.

Each unit is self-contained, and uniquely numbered if necessary. Units can be placed anywhere, and their meaning can be a function of their proximity to other graphical elements on the page. Units can also work together. Each small glyph can be thought of as a (labeled) unit. They can also be associated with other units, to form a larger (and more heavily error-correction protected) message. They also can be used to generate a very simple implementation for embedding digital data within logos, text, line graphics, presentation graphics, etc, and this can be done for either a small, single-unit message, or for a large message that uses many units.

DETAILED DESCRIPTION OF THE INVENTION

Figure 1:
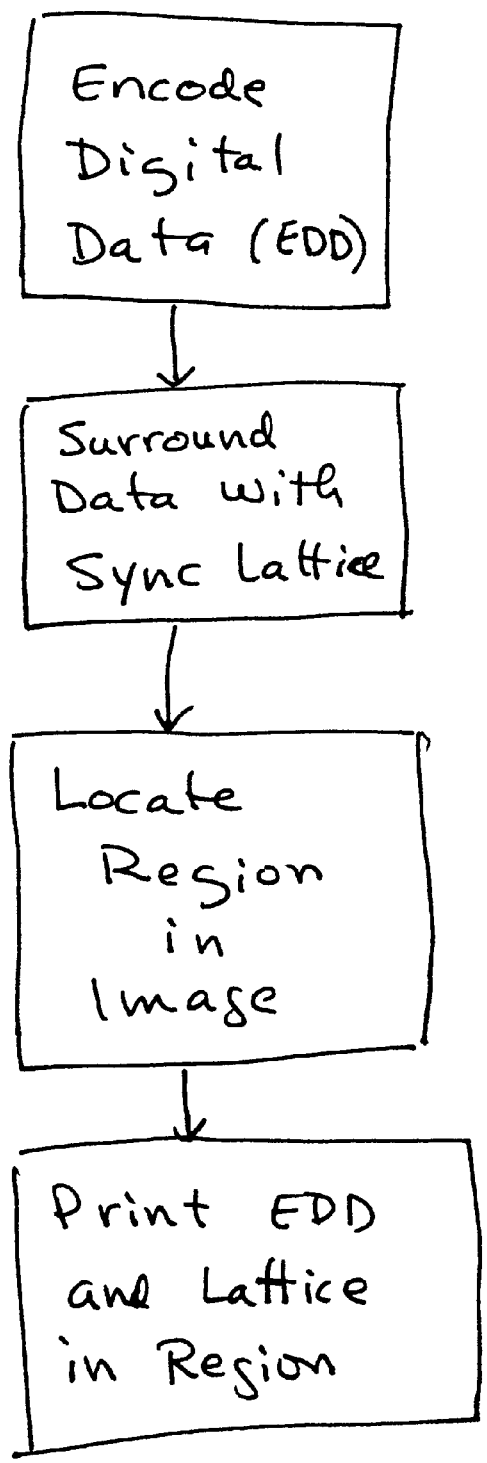
FIG. 1 is a flow chart of a method for formatting embedded digital data to allow small amounts of data to be embedded in arbitrary regions of an image.

The following describes a simple method for formatting embedded digital data to allow small amounts of data to be embedded in arbitrary regions of an image.

There are many applications where it would be useful to store and retrieve small amounts of embedded digital data, such as pointers to electronic data, interactive multi-media applications, rendering information for bilevel and color printing, extraction of quantitative data in a presentation graphics applications, information for controlling real-time post-printing finishing operations, data embedded in forms, logical information for reconstruction of electronic format from the image, machine-readable local data that corresponds to human-readable data in the vicinity, etc.

One particular type of rendering would be to place the digital data inconspicuously within a larger glyph-like region. Many of the glyph-like marks could be written on the page for stippling alone, and would carry no digital information. However, small subregions that are actually edd would carry data. For this rendering, it is necessary that the edd regions (where data is actually stored) be unambiguously identifiable as such. Examples are given for methods by which this can be achieved.

Terminology edd: embedded digital data, a generic term that is also used to represent the set of marks in a particular instance.

glyphs: the popular name for embedded digital data. "Glyph" is sometimes used to mean a single (1-bit) mark, and sometimes to refer to the entire set of such marks.

frame: a rectangular region containing m×n data glyphs sync data: glyphs that are not data (and are not encoded) but are used to find the location and ordering of the glyphs.

sync line: a line of sync (and possibly other) data sync lattice: the lattice of sync lines. This is typically a rectangular lattice, where each frame of data is bounded on four sides by sync lines. Thus, this is a lattice of glyphs into which the glyph data is "poured".

sync crossing: the location where two sync lines cross. These are special reference points in the sync lattice.

meta-data: glyphs that are used to describe how the glyph data is written. This may include encoding parameters (block size, parity bytes, crc bytes).

CRC: cyclic redundancy code, for determining if the data has been correctly decoded.

ecc: error correction coding—the addition of parity bits to the data in order to identify and correct errors.

parity: another name for the symbols added to the data to allow errors to be identified and corrected.

bit: each 45-degree glyph encodes, through its orientation, a bit of information, because we interpret the value of the glyph as 0 or 1 depending on the orientation. Hence, we often use "bit" interchangeably with "glyph".

data: the information from the user's application that is actually encoded by the glyphs.

There are many possible applications where embedded digital data, in the form of relatively inconspicuous "glyphs", can be used. Much variability in glyph properties can be expected. For example, in these applications:

(1) the amount of data stored can vary from a few bytes (a filename) to 50,000 bytes (in a paper floppy);

(2) the edd can be put in a single known place, or dispersed in a variable and content-determined number of places, or placed in a contiguous redundant pattern for readback with poorly aligned sensors;

(3) the size of individual glyphs can vary from very small (where appearance and quantity are most important) to very large (where low-quality fax data must be reliably read);

(4) the glyph error correction coding can be computed symbol-wise in one-dimensional blocks (most common), symbol-wise in two-dimensional blocks (most robust for large amounts of data), or bit-wise in two-dimensions (e.g. for protection of small amounts of data against damage correlated either horizontally or vertically); and (5) the glyphs can be placed on white background, behind black foreground, or within stippled foreground.

It should be evident that no single formatting technique will work efficiently under all these various conditions. Thus, the system will need some flexibility in choosing the glyph format to use.

When many different formats are possible, the information about which format is actually used may be passed to the reader by the application. In effect, the information is "hard-wired" into the application, and into both the writer and the reader. In other situations, where the reader may be presented with multiple formats, it is important for the reader to be able to determine which format is in use from the image data alone.

For robust reading, it is best to embed glyph data within a glyph sync lattice. Some of the bits in a sync lattice are reserved for synchronization of the data: they can be used both to identify the sync lattice itself and to identify the glyph centers where the horizontal and vertical sync lines cross. One possibility that the sync bits in this lattice could be keyed to the internal formatting. Thus, for example, if nine bits in the sync lattice were used to delineate each crossing of lattice lines (5 horizontal and 5 vertical), then it would be theoretically possible to indicate 512 different formatting types from the choice of these nine bits alone. Of course, the larger the variability in the sync data, the more work is required to identify the sync lattice itself, because it is necessary to search for a repeating pattern without knowing a priori what that pattern is.

The concept is that small amounts of data, placed on paper in arbitrary locations and surrounded by arbitrary graphical elements, can be found automatically and read reliably.

If inconspicuous appearance is important, the edd can be embedded within a larger region of identical symbols. For example, in presentation graphics the graphical elements such as pie charts and bar graphs can be stippled with glyph-shaped marks, in which the actual edds can be embedded. To the eye, the stipples are relatively uniform and undifferentiated spatially; the edd are not distinguishable except by machine.

We consider a situation where the edd is composed of a single self-contained frame, surrounded by a rectangular sync lattice. Multiple attached frames could also be used, but this situation is more similar to other embodiments for larger and variable amounts of data. Here, situations are considered where:

(1) there is a relatively small amount of data that is encapsulated in an edd;

(2) the edd contains an exterior sync lattice consisting of a single rectangular ring of glyphs, which is used to identify the region interior as one with known characteristics (e.g., size, encoding method, etc.);

(3) there can be multiple edds on the page, which can be linked by the application, but each of the separate edds stands alone in terms of encoding, locating and decoding.

To allow the edd to be retrieved from any surrounding graphics, it must have an unambiguous signature. This signature is most easily given by a surrounding sync lattice, and the exact sequence of bits in the sync lattice must be one of a pre-defined set of such lattices. There must be enough bits in the sync lattice to distinguish it from random data. This will depend on the application, going from a low of perhaps 16 bits up to 32 bits, which should be sufficient for most situations. An implementation example for a very small amount of data (8 bytes within an 8×8 glyph frame embedded within a single 10×10 glyph edd) is given below.

The encoding parameters for the frame include the number of bytes of user data, the number of bytes of error correction, and possibly the number of bytes of CRC.

For very small edd, the encoding parameters for the frame must be known for the specific type of edd (determinable, e.g., from the code pattern in the sync lattice), because there is not enough data available within the frame to encode this information along with the data. Thus, for small frames, the number of parity and CRC bytes can be hardcoded by convention. In the example we take a small 8×8 frame that holds a total of 8 bytes and stipulate that 5 bytes are user data, 2 bytes are ecc, and 1 byte is CRC. Again, a variety of formats can be used, all defined in advance and indicated to the reader by the specific bit pattern that constitutes the sync lattice. For a given frame size, the bit pattern in the sync lattice can consist of an invariable part that depends on the frame size and a variable part that indicates the encoding of the data within the frame. The comments above about the number of bits in the sync lattice that are required to distinguish the frame from random data apply to the invariable part of the sync lattice.

For larger data frames (such as 12×12 or bigger), it will be easier to use some of the sync lattice bits to hold information about the encoding of the data within the frame. Various information can be held within the sync lattice. Assume that all the data within the frame is composed of either valid user data or parity (and no CRC). Then the minimum amount of such information is just the number of parity bytes used within the frame. For the applications being discussed here, the number of parity bytes used would certainly not exceed 31, requiring 5 bits for specification. [31 bytes of parity is a large amount. A 16×16 glyph frame has only 32 bytes in total.] If only an even number of parity bytes are to be used, 4 bits will suffice to specify up to 30 parity bytes. Some applications will also require CRC because of the high cost of obtaining an incorrect decoding of the user data. The only practical values for the number of bytes of CRC are in the set {0, 1, 2, 4}. Thus, 2 bits should suffice to describe the CRC. Any bits that are used to specify encoding and CRC should be placed redundantly within the sync lattice to avoid failure due to local damage.

Applications

Here is a small list of possible applications of this invention. In the following, imagine that each edd is small, composed of 10×10 glyphs at 60 glyphs/inch, which is approximately equivalent in size to a 14 pt upper-case character. The edd holds 5 or 6 bytes of user data, plus 2 or 3 bytes of ecc. This is sufficient to specify a pointer to a unique object (one out of hundreds of billions) or typically about 10 ascii characters with compression.

For many of the applications, the edd can be completely hidden by embedding it within regions of gray-appearing edd stipple.

The functions supplied by the edd typically fall into the following categories:

(1) Reference: they embody a pointer to some electronic data.

(2) Image Reconstruction: they describe the content of part of the image, including information about the local logical structure which may not be apparent from the elements as they are laid out.

(3) Rendering: they describe instructions for rendering on different output devices.

Forms

Automatic interpretation of forms can be simplified and made more robust with strategically placed small edd. For example, one edd can specify the form id, which in turn gives the electronic format and date of origin.

An edd can be placed next to each form item, giving the action to be taken if the item is marked. For example, a telephone number (7 digits) can be encoded by one such edd. Thus a form could be a list of possible recipients for fax distribution, and a check near a name (with an associated edd) will result in some document being faxed to that recipient. This may be particularly useful if the electronic format is not available.

Tables

A table can have a glyph background stipple, into which any number of edd can be inconspicuously embedded. Small amounts of edd can be placed at strategic locations within these stippled backgrounds.

(1) It is often difficult to identify tabular data on scanned images. Edd can be placed at the top, or in the corners (etc), to identify the region as a table. It can also give a pointer to an electronic file or a database entry for the table.

(2) The rows and columns can be enumerated and/or labelled by edd placed near each row and column heading. This could be simply an index giving the row or column number, or it could be a link to some other information about the row or column of data (such as the origin of the data or the location of a graphical representation of the data). Or, it could be instructions for rendering of the row or column (e.g., the color).

(3) The individual entries can be labelled with the value of the entry.

Alternatively, if the entries are generated from a spreadsheet, a pointer can be given to the functional generator for each entry.

Page Numbers

A small edd embedded in a stipple surrounding the page number, or just placed next to the page number, can give that number, as well as a pointer to the entire document.

Figure Captions and Footnotes

A small edd within a covering stipple or just near the figure caption can include the figure number and a pointer to file (etc.) from which the figure is derived. Likewise, footnotes can labelled by a preceeding edd, giving a pointer to its place of origin within a file, or to some other electronic object.

Layout Information

A small edd the size of a character can preceed each paragraph (e.g., within an indented first line), labelling the paragraph with an index and/or a pointer to the appropriate part of an electronic document.

Graphs

A small edd on each axis can give a label for the axis, including the units in which distance is measured. An edd can be associated with each number decorating each axis, and with each line in a graph.

Graphics Rendering

It has been demonstrated that color information can be embedded within a large stippled region (glyph) in a bar chart. Each bar was to have a different color, when rendered on a color printer, and the glyphs for each bar contained data that constituted a color labelling. When the bar chart was copied with a B/W copier, the color information remained within the glyph, and could be regenerated using a suitably constructed scanning device and a color ROS.

The following is a robust method for doing this. Further, it is not necessary to preserve the glyph information in the rendering. For example, consider the above example. The data initially written has a stipple containing edd that describes the color to render each region. When rendering on a B/W printer, the edd can specify the rendering technique and the region over which it is used. Thus, it could specify differently appearing B/W stipples and patterns for each bar of the chart, and those patterns need no longer contain the edd. In such a case, the original representation, and any ordinary copy of it, contains edd and specifies the rendering on an edd-enabled digital copier. But a copy from an edd-enabled B/W printer has a special rendering that does not necessarily contain edd, so that a color rendering cannot necessarily be obtained from it.

The edd can also contain data giving the values of the units represented in such graphics. For bar charts, the data can be the size of each bar; for pie charts, the size in units or percentage represented by each slice. This then allows easy conversion of representation, e.g., between bars and pies.

Color and Grayscale Calibration of Scanners, Printers and Copiers

The edd be used for color calibration of various digital input and output devices, and for color correction of colored images. In the following, we only assert that the information can be collected, and assume that color correction and calibration can be done using this information.

Consider the color calibration of a scanner. A special color calibration page is needed that has regions of accurately calibrated colors, with edd within each separate color region that describes the specific color in the region. When the page is scanned, the scanned color in each region is compared with the data in the edd and corrected. Consider the color calibration of a printer. This requires a calibrated color scanner. The process has two steps. In the first, a calibration image is printed from the printer to be calibrated, with edd within each separate color region that describes the color that the region should have. In the second step, the printed page is scanned by a calibrated color scanner, the edd is read, and the values are compared with the input color values from the scanner. From this information, the color production process in step 1 can be changed to make the output color closer to the desired value.

Note that all the above also apply to the calibration of monochrome digital copiers, which typically have a grayscale scanner and binary IOT. The scanner can be calibrated using a special grayscale continuous tone image with edd near each gray sample. The calibration is derived from error signal that are developed from the difference between the actual printed gray (given by the edd) and the gray measured by the scanner. The IOT can be calibrated by printing output that contains edd next to each "gray" patch, and then capturing an image of the output using a calibrated grayscale scanner. The IOT calibration is derived from error signals developed from the difference between the correct measured gray scanned value and the value that was supposed to have been printed by the IOT (given by the edd).

Color Correction of Color Copiers

The edd can be used for color correction by an edd-enabled and calibrated color digital copier. There are two cases here:

(1) The input image has edd within a few stippled colored regions. These edd can be read and used to indicate the color that should be produced at that location. Comparison of the actual scanned color with the intended color can be used to generate a correction factor for that color.

(2) If it is not possible to place edd inconspicuously within uniformly colored regions, color correction is still possible. It is necessary for the device that printed the color image to print an additional calibration image with edd indicating the desired color in each region. On scanning by the calibrated color copier, a correction factor is again obtained for each color. With a set of such corrections over the color space of the document, correction factors for all colors can be found by interpolating from appropriate tables, and the color corrected image can be printed.

Implementation Example

We give here a method for placing up to five bytes of user data in a self-contained square, composed of a bounding 10×10 sync lattice and an interior 8×8 glyph data frame. If more than five bytes are required, additional edd units can be added and joined at the level of the application.

In our example, the synch lattice is entirely fixed. All 36 bits in the sync lattice are used for making a unique identification of the edd from within any arbitrary glyph stippling. The data frame within the sync lattice is 8×8 bits, which is close to a lower bound for practical use. For this example, of the eight bytes that can be placed within the data frame, we choose them to consist of 5 data bytes, 2 parity bytes, and one CRC byte. The edd may be used either as individual graphical elements on a page, or embedded within an arbitrary glyph stipple. The glyph stipple, being arbitrary, may have low-frequency components (e.g., regions of connected 0 or 1 glyphs). To maximize our ability to recognize the edd within such noise, the sync lattice is chosen to have high-frequency components and to have a little redundancy. The former will help differentiate the sync lattice from some arbitrary low-frequency glyph stipple into which it may be embedded. The redundancy may simplify the problem of identifying the sync lattice from within a glyph stipple.

```
1 0 1 1 0 1 1 0 1 1
0                 0
1                 1
1                 1
0                 0
1                 1
1                 1
0                 0
1                 1
1 0 1 1 0 1 1 0 1 1
```

The edd may also be embedded in a repeating pattern in a larger stipple. This can be used either for redundancy (by repeating the same pattern) or to carry more information then 5 bytes. For such a repeating pattern, the sync lattice around each 8×8 data frame will be identical:

```
  .              .              .
  .              .              .
  .              .              .
  0              0              0
  1              1              1
..0 1 1 0 1 1 0 1 1 0 1 1 0 1 1 0 1 1 0 1 1 0..
  0              0              0
  1              1              1
  1              1              1
  0              0              0
  1              1              1
  1              1              1
  0              0              0
  1              1              1
..0 1 1 0 1 1 0 1 1 0 1 1 0 1 1 0 1 1 0 1 1 0..
  0              0              0
  1              1              1
  1              1              1
  0              0              0
  1              1              1
  1              1              1
  0              0              0
  1              1              1
..0 1 1 0 1 1 0 1 1 0 1 1 0 1 1 0 1 1 0 1 1 0..
  0              0              0
  1              1              1
  .              .              .
  .              .              .
```

Placement of small amounts of data on paper, to be used with a local scanner, can be used for hyper-linked multimedia applications that use image data from a "pen" scanner. For the purposes of that implementation, the digital data is not expected to reside within larger glyph regions, and the emphasis is on extracting x-y coordinates that are encoded within small amount of data.

Another application is encoding a small amount of data using a periodic edd pattern, typically without sync, such that any sufficiently large rectangular subregion contains the entire repeated message. This is useful when the alignment between scanner and paper is not well known, and only a small amount of data is to be obtained.

While the invention has been described with reference to a specific embodiment, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A process for printing a small amount of embedded digital data in an arbitrary region of an image on media, comprising:

encoding the digital data into a rectangular area of glyphs;

surrounding the rectangular area of glyphs with a rectangular sync lattice;

locating a region in the image which contains arbitrary graphical elements;

printing the encoded digital data and the sync lattice in the located region, such that arbitrary graphical elements surround the sync lattice, wherein the encoded digital data appears visually indistinguishable from the located region and wherein the printed sync lattice comprises enough bits to distinguish it from the surrounding arbitrary graphical elements during decoding.

2. The process of claim 1, wherein the located region comprises an arbitrary glyph stipple containing no embedded digital data.

3. The process of claim 2, wherein the glyph stipple comprises low frequency components and wherein the sync lattice comprises high frequency components and little redundancy.

4. The process of claim 1, wherein the sync lattice comprising a number of glyphs for identifying the rectangular area as a data block, and a number of glyphs to identify the formatting of the data.

5. The process of claim 1, wherein the embedded digital data identifies a form that the glyphs are printed on.

6. The process of claim 1, wherein the embedded digital data identifies a pointer to a point on the media.

7. The process of claim 1, wherein the embedded digital data identifies how an area of the media that the rectangular area is printed on should be rendered.

8. The process of claim 1, wherein the embedded digital data identifies a page number that the embedded digital data is printed on.

9. The process of claim 1, wherein the embedded digital data identifies a paragraph or figure by number.

10. The process of claim 1, wherein the embedded digital data identifies the color of the area on which the glyphs are printed.

11. The process of claim 1, wherein the embedded digital data identifies a table entry.

12. The process of claim 1, wherein the embedded digital data identifies a document.

13. The process of claim 1, wherein the embedded digital data identifies a URL.

14. The process of claim 1, wherein the embedded digital data identifies a document printing process to be invoked.

15. The process of claim 1, wherein the embedded digital data identifies a particular piece of data in a table.

* * * * *